Sept. 29, 1953   J. R. STOVALL, JR., ET AL   2,654,060
CAPACITY TYPE STRAIN GAUGE AND METHOD OF MANUFACTURE
Filed Jan. 20, 1950                                   2 Sheets-Sheet 1
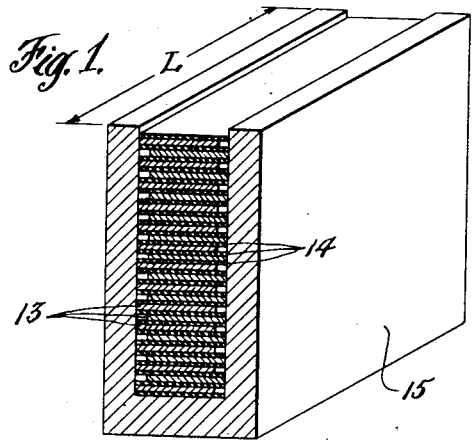
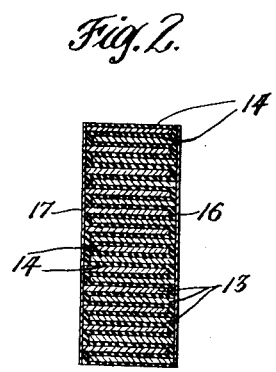
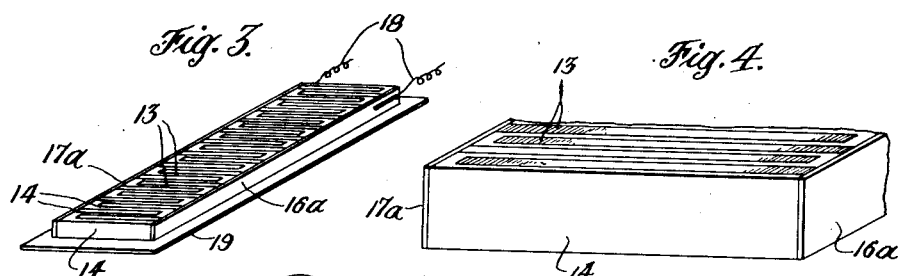
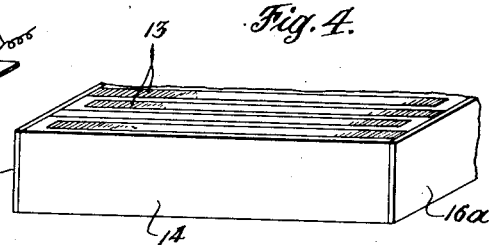
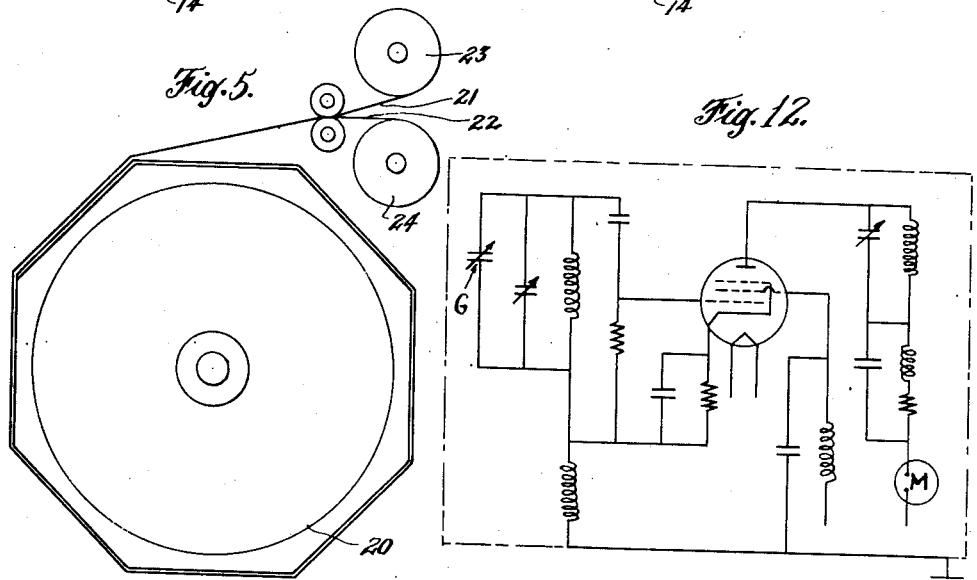
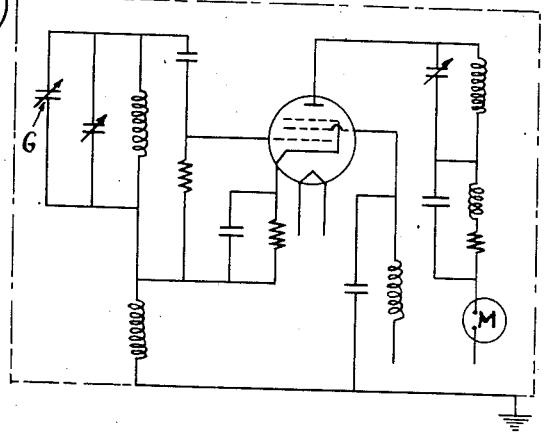
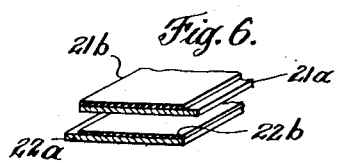
Inventors
John R. Stovall Jr.
Irving Weintraub
By
Attorneys Sept. 29, 1953    J. R. STOVALL, JR., ET AL    2,654,060
CAPACITY TYPE STRAIN GAUGE AND METHOD OF MANUFACTURE
Filed Jan. 20, 1950    2 Sheets-Sheet 2
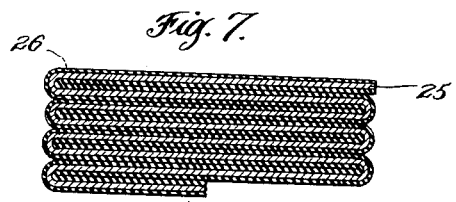
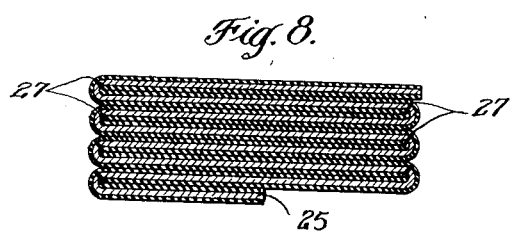
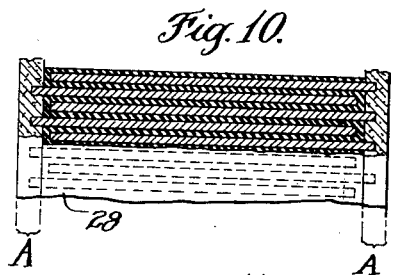
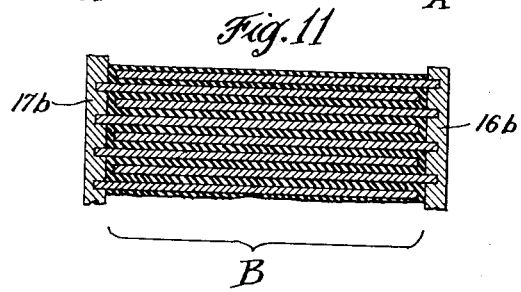
INVENTORS
John R. Stovall Jr.
Irving Weintraub
BY
ATTORNEYS Patented Sept. 29, 1953

2,654,060

UNITED STATES PATENT OFFICE 2,654,060

CAPACITY TYPE STRAIN GAUGE AND METHOD OF MANUFACTURE

John R. Stovall, Jr., Doylestown, and Irving Weintraub, Neshaminy, Pa., assignors to Tinius Olsen Testing Machine Company, Willow Grove, Pa., a corporation of Pennsylvania Application January 20, 1950, Serial No. 139,563

9 Claims. (Cl. 317—246)

1

This invention relates to strain gages and is especially concerned with gages of the capacitance type, i. e., gages in which strain in the piece being tested effects a change in capacity of a condenser or capacitor. More particularly the invention is concerned with gages of strip form adapted to be pasted on a surface of a piece to be tested.

One of the important general purposes of the invention is to provide a capacitance type gage which is characterized by a high absolute capacity and high absolute capacity change, by a large change in capacity in relation to change in strain, and by substantially linear response, i. e., substantially linear capacity change in relation to change in strain.

The invention also has in view the provision of a capacitance type gage which is of rugged, unitary construction, avoiding the use of relatively movable unattached plate elements.

A further important general purpose of the invention is to provide a simple, effective and economical method for manufacture of gages having the characteristics just mentioned.

For convenience in use it is of advantage that strain gages to be applied to test pieces be of relatively small size and total volume, preferably of the form of a flat strip, for instance a strip about one inch long, three-eighths inch wide, or smaller, and a few thousandths of an inch thick. Gages of this physical form are readily applied to a test piece, as by bonding the gage to the piece by means of an adhesive.

In the case of capacitance type gages, however, it is very difficult to provide a gage of the general size and shape referred to and at the same time obtain relatively high absolute capacity, high absolute capacity change, and high capacity change in relation to change in strain, and also substantial linearity of response. If the gage is made up of a group of superimposed condenser plates which are relatively movable (according to change in strain) to vary the extent of overlapping of the plates and thus the capacity thereof, while the resulting gage can have high absolute capacity change, and can be characterized by relatively large capacity change in relation to change in strain, nevertheless such a gage has serious disadvantages. For instance, it is somewhat difficult in a gage of the type just mentioned to provide a high degree of linearity of response. Further, the practical problems of maintaining plate spacing and orientation is very difficult. There are also a number of other disadvantages.

The reasons why linearity of response and high per cent capacity change in relation to percentage strain are desirable are obvious, since these characteristics determine sensitivity and accuracy and greatly facilitate translation and reading of the gage results. The high absolute capacity change

2 in the gage is desirable to provide a quantity capable of easy and accurate measurement. This is also highly desirable due to the fact that the gages are ordinarily connected to the measuring equipment through a cable of appreciable length, which cable itself has appreciable capacity that in many adaptations is added to that of the gage itself in the quantity measured in the analyzing circuits. This results in the necessity of measuring a small change in a large quantity if the gage absolute capacity change is small compared to the cable capacity.

The gage of the present invention is characterized by various of the desirable properties referred to above. The general structure and operation of the gage of the invention is here briefly described, in order to clarify the specific purposes and advantages of various features described in detail hereinafter.

In general, the gage of the invention comprises a strip having a paper or other suitable base to which the gage itself is fastened, the assembly being adapted to be adhesively bonded to the specimen to be tested. The gage itself is made up of a series of interbonded layers of metal and dielectric arranged edgewise on the base, with the maximum area faces of the metal plates generally perpendicular to the plane of the specimen surface, so that the plates may be said to have a large height to thickness ratio. This is an important feature of the invention. Preferably the dielectric separating the plate faces is small as compared with the plate thickness for highest sensitivity. For low sensitivity, the dielectric is made thicker than the plates, otherwise utilizing the same construction.

Unit strains in the specimen are transmitted through the paper or other base to the immediately adjacent portions of the plates and dielectric. The spacing of the maximum area faces of the plates is changed in accordance with strain. Thus, the arrangement of the invention in its simplest form provides unit capacity change in direct relation to unit strain, and maximum absolute capacity change is attained with maximum absolute capacity. Further refinements hereafter described increase the ratio of unit capacity change to unit strain. The gage of the invention is of further advantage since it provides maximum absolute capacity per unit volume.

The invention not only provides a gage having the desirable characteristics already mentioned but in addition provides a simple and effective method for manufacture of such gages.

Several embodiments of the gage itself and of the method are illustrated in the accompanying drawings in which—

Figure 1 is an isometric view of a group of condenser plates with intervening layers of dielectric material stacked in a channel shaped form used in the process of manufacture of the gauges of this invention;

Figure 2 is a sectional view through the stacked layers of condenser plates and dielectric material formed according to the invention;

Figure 3 is an isometric view of a completed gage which is cut from the stack illustrated in Figure 2;

Figure 4 is a greatly enlarged fragmentary view of a portion of the gage shown in Figure 3;

Figure 5 is a somewhat diagrammatic view illustrating an alternative method for making the gages;

Figure 6 is an enlarged fragmentary view of certain layers of condenser plates and dielectric material used in accordance with the method of Figure 5;

Figures 7 to 11 inclusive are somewhat diagrammatic views illustrating still another alternative method for making gages according to the invention; and Figure 12 is a schematic diagram of a circuit which may be utilized in association with the gages of the invention.

In accordance with one method for making the gage of the invention, certain steps of which are illustrated in Figures 1 and 2, metal plates and layers of dielectric material 13 and 14 are alternately stacked in a channel form 15. In the embodiment here shown the dielectric layers 14 are of width equal to the width of the channel in the member 15; whereas the metal plates 13 are of lesser width and are offset from each other or staggered in the manner indicated, so that the edges of alternate plates lie adjacent opposite side walls of the form 15. In a typical case, the metal plates may be made of aluminum foil and the dielectric layers may comprise strips of heat bondable material such as a thermosetting resin having appropriate dielectric properties. After assembly of the stack in the form, heat is applied to the assembly and pressure is applied on top so as to laminate the stack, the heat and pressure preferably being sufficient to cause the dielectric material to infill the spaces occurring alternately at opposite sides of the form in the region of the inner edges of the plates 13, and to cause either thermoplastic fusion and bonding or thermoset flow and cure, as the case may be.

This results in a homogeneous structure as illustrated in Figure 2, in which the condenser plates 13 are completely imbedded in a block of dielectric material, except for one edge of each plate, i. e., the edges which are presented alternately toward opposite sides of the structure. If the edges are not clean after lamination, they may be cleaned by abrasion. These free edges at each side are then electrically interconnected, preferably by application of coatings 16 and 17, of silver paint or the like, so that the condenser plates are thereby coupled in parallel in two sets, with the individual plates of the two sets interleaving with each other.

A gage is then made from the laminated stack by slicing off a thin layer from the end of the stack, so as to produce a slice of the kind illustrated in Figures 3 and 4. The slicing is normally effected transversely of the stacked layers, most desirably substantially perpendicularly.

Connecting leads such as indicated at 18 may then be fastened in any suitable way as by soldering to the portions 16a and 17a of the side coatings of the original complete stack.

The gage slice is desirably coated on all sides with an insulating material and is preferably mounted on a strip, for instance a paper strip such as indicated at 19 in Figure 3 the margins of which project somewhat beyond the gage on all sides. It is preferred to adhesively bond the gage strip to the paper strip 19 and the entire assembly may then readily be applied to a test piece as by adhesive bonding.

As will be seen, the gage produced in accordance with the foregoing incorporates a multiplicity of condenser plates having large height to thickness ratio positioned edgewise in the gage. As above mentioned, for highest sensitivity, the interjoining dielectric is preferably thinner than the plates. Because of these and other factors mentioned hereinafter, this form of construction makes possible the provision of a gage of relatively high absolute capacity, which gage still further achieves various of the other desirable purposes hereinbefore mentioned in a way which will be described more fully below.

The technique which has been briefly and more or less generally described is subject to certain variations without departing from the spirit and purpose of the invention. In addition certain collateral factors should be kept in mind, and variations of these matters are discussed just below.

First, with reference to the stack of elements arranged in the form 15, this stack may be made up in various different ways. Thus, in addition to the specific arrangement described above, the alternate layers of metal plates and dielectric material may be built up by stacking strips of dielectric material carrying a metalized coating on one side (applied by any of the well known techniques for such purposes, for instance by use of silver paint). As another alternative, metal foil strips carrying a coating of dielectric material covering either one or both sides of the foil may be stacked up in the general manner already indicated, this latter technique being a preferred method because such metal foil strips with a coating of dielectric material are less subject to damage and more readily handled than is the case with strips of dielectric material of appropriate thickness carrying a metalized coating. The use of metal foil strips carrying a dielectric coating is of further advantage since such use facilitates the provision of a gage in which the metal plates are of greater thickness than the dielectric layers, this factor being important according to the invention for reasons brought out herebelow.

Whatever specific stacking method is used, application of heat and pressure is advantageously relied upon to laminate the stack from which the gage slices are cut.

It may here be pointed out that the length L of the pieces comprising the stack may be made quite great, for instance up to several inches, so that a very large number of gages be sliced from a given stack.

With respect to the metal plates, any metal foil may be utilized, advantageously aluminum, zinc or tin foil, or even foils made of precious metals. In a typical case the thickness of such foil may be 0.0005 inch, from 0.0035" to about .002" being a suitable range.

The layers of dielectric material may be made of any suitable dielectric having bonding or adhesive properties. Of especial advantage are thermoplastic materials, due to ease of construction and usual low modulus, an advantage later discussed. Typical examples of thermoplastic resins which are suitable are polyvinyl chloride, polyvinyl acetate and copolymers of vinyl resins, such as vinyl chloride-vinyl acetate, and vinyl chloride-vinylidene chloride. Still other resins such as polyethylene may be used. Silicone compounds are also advantageously used. Still other useful resins are those of the polyvinyl butyral type, for instance "Permacel" made by the Industrial Tape Corporation.

The thickness of the dielectric layers may be varied, but is most advantageously less than that of the metal plates, a typical dielectric thickness being .0004". A suitable range is from 0.0001" to 0.001".

The lamination of the stack in a channel form such as indicated at 15 in Figure 1 is of advantage since this facilitates flowing of the dielectric material into the voids in the stack, without, however, covering the free edge of each of the plates, which are alternately presented at opposite sides of the stack. With the free edges of the plates exposed the application of the conductive coatings 16 and 17 to the sides of the stack is facilitated.

With regard to slicing of the stack to form the gage strips, any convenient slicing technique may be utilized, one particularly effective method being the employment of a so-called microtome, i. e., a rotary or sliding slicing machine commonly used in slicing specimens for microscopic examination. A more suitable and rapid device is the Ultramicrotome. In this type of slicing machine, a carefully shaped and pitched very high speed rotary blade is utilized, and this has been found to provide effective slicing for the purposes herein contemplated. The slices may vary somewhat in thickness, depending upon the use for which the gages are intended, ordinarily a slice of about 0.003" or 0.004" being satisfactory, although somewhat thicker or thinner slices may be used, for example from 0.001" to 0.006".

With regard to the foregoing thickness and other dimensions, it is pointed out that the representation in the drawings is not intended to accurately indicate relative thickness or dimensions, these proportions being exaggerated in various ways merely for the purpose of illustration.

However, with the proportions and dimensions as described, it will be seen that in the gage slice of the invention, the metal plates are of relatively great height, as compared with the thickness thereof, i. e., the plates are of relatively great dimension vertically when the gage strip is mounted horizontally on a test piece, as compared with the thickness of the plates previously referred to as a large height to thickness ratio. It will further be seen that in the preferred gage strip, the layers of dielectric material are thinner than are the metal plates. These relationships are of importance for a number of reasons. Firstly, they are of importance in providing the maximum absolute capacity per unit gage volume with the plate faces perpendicular to the direction of strain. Moreover, with a gage adhesively bonded to a test piece throughout the entire flat bottom area thereof (of the gage) the relationship between thickness of the metal plates and the thickness of the dielectric layers serves to augment the percentage change in capacity strain. The plates, being made of metal have a relatively high modulus in relation to that of the dielectric layers, so that most of the strain is reflected in compression of the dielectric layers and this, in turn, accentuates the change in plate spacing and thus augments the per cent capacity change in relation to per cent strain. Thus a high ratio of plate modulus to dielectric modulus is desired. The arrangement as described also results in substantially linear response of the gage in relation to strain.

With gages of this design and with the typical proportions discussed, the capacity changes for strain gage work of ordinary types are of quite readily measurable magnitude, even for the smallest size gages.

In accordance with the fabricating technique illustrated in Figures 5 and 6, various strips of metal foil carrying dielectric coating are wound upon a mandrel as somewhat diagrammatically indicated at 20, this mandrel having for example a polygonal external shape as indicated. Two strips such as indicated at 21 and 22 are fed from supply reels 23 and 24 and wound in superimposed relation upon the mandrel, as by rotation of the mandrel itself. Strip 21 may comprise a metal foil strip 21a carrying a dielectric coating 21b partially or wholly covering one or both sides of the strip. Strip 22 may similarly comprise metal foil indicated at 22a carrying a dielectric coating 22b. It will be seen that these two strips partially coated as shown are identical but are relatively inverted and are fed to the mandrel in offset relation as clearly indicated in Figure 6, so that the free edge of strip 21 projects at one side and a free edge of strip 22 projects at the opposite side. Upon the winding of a multiplicity of layers of these strips upon the mandrel, the layers are cut in radial planes at the junction points or angles between the sides of the polygonal shape of the mandrel, and in this way a plurality of stacks of strips are produced which may then be laminated under heat and pressure, by insertion in a channel form of the kind illustrated in Figure 1.

Still another technique for constructing gages according to the present invention is illustrated in Figures 7 to 11 inclusive. In this arrangement the gages are fabricated individually, instead of being cut or sliced from a stack. The several views of Figures 7 to 11 diagrammatically illustrate a series of steps, as follows:

First, a coated or uncoated wire such as a small gage copper wire is flattened and this flat wire if uncoated is then coated with a suitable adhesive dielectric material. The flattened wire is indicated by the numeral 25 in Figure 7, and the coating on the wire appears at 26. From the drawing, it will be seen that the flattened and coated wire is wound flatwise upon itself to form a grid having a multiplicity of turns. The loops or bends at opposite side edges of the grid are then cut as indicated at 27 in Figure 8 and after this cutting the free ends are combed out as indicated at 25a in Figure 9. From comparison with Figures 8 and 9 it will be seen that the points of cutting 27 are arranged in offset relation with respect to the center of the loops or bends, so that upon combing out the free ends, alternate lengths of the wire project farther toward opposite sides of the grid. The grid made in this way is advantageously subjected to heat to laminate the structure by fusing the dielectric material, and this operation may be done preferably between the stages illustrated in Figures 9 and 10. In this connection it may be noted that in the upper portion of Figure 10, the dielectric material of the several layers has been fused and bonded.

After fabricating the grid in the manner described, the central portion thereof may be coated with an insulating material, as indicated at 28 in Figure 10, for instance by preliminarily masking the projecting end portions indicated by the letter A. In this connection it may be noted that some of the dielectric material may be removed from the projecting ends of the plates at opposite sides of the grid prior to the masking operation just mentioned. The projecting ends of the several elements of the grid, as shown in Figure 9, are coated at opposite sides with the dielectric material, but it will be understood that even the action of cutting the turns as at 27 in Figure 8 and the subsequent combing out of the ends, as represented in Figure 9, will tend to at least irregularly flake off some of the dielectric material from the projecting end portions of the plate elements.

After coating of the central or mean portion of the grid, the area B may be masked and the masking on areas A removed and these latter areas then coated with conductive or metalized paint such as silver paint, in order to provide connection in parallel of all of the condenser plates projecting at each side, these coatings being indicated at 16b and 17b in Figure 11.

The method of making up individual gage strips in accordance with the general technique of Figures 7 to 11 may be carried out either by hand or by automatic machinery, for instance by the employment of a loom of the Jacquard type.

It will be understood that a strip made up in accordance with Figures 7 to 11 may have connecting leads attached thereto in the general manner of leads 18 described above in connection with Figure 3, and further that this particular gage may also be mounted on a supporting strip such as the strip of paper shown at 19 in Figure 3.

In Figure 12 there is illustrated one form of measuring circuit with which gages of the kind described above may be used. The special features of this circuit need not be considered in detail herein although it may be mentioned that the gage itself may be coupled thereto in the position of the condenser element indicated at G. A meter such as a milliammeter shown at M in Figure 12 may be calibrated in units of strain.

We claim:

1. A method for making a capacitance type strain gage, which method comprises winding a flattened and dielectric-coated wire back-and-forth to form a sinuous grid having adjacent lengths of the wire interconnected by turns or loops toward opposite edges of the grid, cutting said loops at both of said edges of the grid, combing out the free ends on opposite edges of the grid and interconnecting alternate lengths of wire of the grid adjacent said opposite edges to form two interleaving sets of condenser plate elements each comprising a multiplicity of elements connected in parallel.

2. A method according to claim 1 in which the dielectric coating of the wire is formed of a heat bondable material and in which the grid is consolidated by heating the thermoplastic dielectric material.

3. A method according to claim 1 in which the cutting of the loops adjacent the edges of the grid is effected at points offset from the center of each loop to provide two sets of interleaving wires in the grid alternately projecting toward opposite edges of the grid.

4. For use with a machine having mechanism for developing strain in an article to be tested, a capacitance type strain gage in the form of a thin, flat strip adapted to be bonded to the test article whereby to elongate in accordance with the strain in said article, said gage comprising a plurality of capacitors electrically connected in parallel, a flat flexible sheet of insulating material having adhesive means mounting the capacitors on the sheet and further having means to bond the gage to the test specimen, each said capacitor having conducting plate elements mounted in face-to-face relationship and the plates of each capacitor separated from one another by generally flexible dielectric material and oriented in a position generally perpendicular to said flat strip, the plates being of substantially greater dimension in a direction generally perpendicular to said strip than in a direction generally parallel the plane of the strip.

5. A strain gage according to claim 4 in which in each capacitor the dimension of the conducting plates in a direction generally parallel to the plane of the strip is substantially greater than the dimension of the separating insulation material.

6. A strain gage according to claim 4 in which the conducting plates comprise coatings of metal applied to said dielectric material.

7. A strain gage according to claim 4 in which the conducting plates comprise metal foil and in which the dielectric material comprises coatings of such material applied to the metal foil plates.

8. A strain gage according to claim 4 in which the conducting plates comprise flattened metal wire.

9. A method for making a capacitive type strain gage comprising: winding strips of metal and dielectric layer upon layer on a mandrel, alternate strips being offset from one another in a direction taken generally parallel to the axis of the mandrel; separating the layers into individual stacks by making a plurality of cuts in planes containing the axis of the mandrel; laminating a stack by applying heat and pressure sufficient to cause the dielectric material to infill the space occurring between edges of alternate strips; electrically interconnecting the alternate strip edges at each side of the stack by application of conductive coatings; and slicing the stack in a direction transverse and intersecting the coated sides.

JOHN R. STOVALL, JR.
IRVING WEINTRAUB.

References Cited in the file of this patent
UNITED STATES PATENTS

| Number | Name | Date |
| --- | --- | --- |
| 1,479,315 | Pickard | Jan. 1, 1924 |
| 1,926,842 | Dubilier | Sept. 12, 1933 |
| 2,229,694 | Ducati | Jan. 28, 1941 |
| 2,238,031 | Brennan | Apr. 15, 1941 |
| 2,386,008 | Shank | Oct. 2, 1945 |
| 2,387,759 | Jarvis | Oct. 30, 1945 |
| 2,395,442 | Ballard | Feb. 26, 1946 |
| 2,405,529 | Smith | Aug. 9, 1946 |
| 2,476,410 | Gardner | July 19, 1949 |

FOREIGN PATENTS

| Number | Country | Date |
| --- | --- | --- |
| 595,657 | Great Britain | Dec. 11, 1947 |
| 903,040 | France | Sept. 21, 1945 |